United States Patent
DeFord

(10) Patent No.: US 7,633,974 B2
(45) Date of Patent: *Dec. 15, 2009

(54) SYSTEM AND METHOD OF ORDERING THE TRANSMISSION OF DATA PACKETS IN A RADIO SYSTEM

(75) Inventor: Mark Russell DeFord, The Woodlands, TX (US)

(73) Assignee: Symbol Technologies, Inc., Holtsville, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 11/841,123

(22) Filed: Aug. 20, 2007

(65) Prior Publication Data

US 2007/0286236 A1    Dec. 13, 2007

Related U.S. Application Data

(63) Continuation of application No. 10/083,040, filed on Feb. 26, 2002, now Pat. No. 7,260,115.

(60) Provisional application No. 60/272,220, filed on Feb. 28, 2001.

(51) Int. Cl.
    *H04J 3/24*    (2006.01)
(52) U.S. Cl. ....................... 370/475; 370/412
(58) Field of Classification Search ........... None
    See application file for complete search history.

(56) References Cited

U.S. PATENT DOCUMENTS

| 5,724,346 | A | * | 3/1998 | Kobayashi et al. | 370/329 |
| 5,875,175 | A |   | 2/1999 | Sherer et al. | |
| 5,875,176 | A | * | 2/1999 | Sherer et al. | 370/230 |
| 5,983,090 | A | * | 11/1999 | Aoki | 455/403 |
| 6,496,499 | B1 | * | 12/2002 | Hamilton et al. | 370/348 |
| 6,754,197 | B1 |   | 6/2004 | Davidson et al. | |
| 6,970,457 | B1 | * | 11/2005 | Richards et al. | 370/382 |

* cited by examiner

Primary Examiner—Phuc H Tran

(57) ABSTRACT

A system and method is provided for reordering the transmission of data packets in a queue of a radio system when an error occurs during the transmission of a data packet to any device destination address. A transmission ordering component is provided that transmits data packets in a queue one at a time until a transmission error occurs for a given destination address. The transmission ordering component then searches through the queue for a data packet with a different destination address than the current destination address being transmitted. The transmission ordering component then returns to transmitting packets one at a time until the end of the queue is reached. Once the end of the queue is reached the transmission ordering component reorders the queue and moves the packets in which transmission errors have occurred to the beginning of the queue. The transmission ordering component then repeats the transmitting data packets one at a time.

20 Claims, 8 Drawing Sheets

| PACKET POINTER | 240 | |
|---|---|---|
| → | DESTINATION ADDRESS # 1 | REMAINING FIRST PACKET FOR DESTINATION ADDRESS#1 |
| --→ | DESTINATION ADDRESS # 1 | REMAINING SECOND PACKET FOR DESTINATION ADDRESS#1 |
| --→ | DESTINATION ADDRESS # 2 | REMAINING FIRST PACKET FOR DESTINATION ADDRESS#2 |
| | DESTINATION ADDRESS # 2 | REMAINING SECOND PACKET FOR DESTINATION ADDRESS#2 |
| | DESTINATION ADDRESS # 2 | REMAINING THIRD PACKET FOR DESTINATION ADDRESS#2 |
| --→ | DESTINATION ADDRESS # 3 | REMAINING FIRST PACKET FOR DESTINATION ADDRESS#3 |
| --→ | DESTINATION ADDRESS # 3 | REMAINING SECOND PACKET FOR DESTINATION ADDRESS#3 |

Fig. 6a

| PACKET POINTER | 240 | |
|---|---|---|
| → | DESTINATION ADDRESS # 2 | REMAINING FIRST PACKET FOR DESTINATION ADDRESS#2 |
| --→ | DESTINATION ADDRESS # 2 | REMAINING SECOND PACKET FOR DESTINATION ADDRESS#2 |
| --→ | DESTINATION ADDRESS # 2 | REMAINING THIRD PACKET FOR DESTINATION ADDRESS#2 |
| --→ | DESTINATION ADDRESS # 4 | REMAINING FIRST PACKET FOR DESTINATION ADDRESS#4 |
| --→ | DESTINATION ADDRESS # 4 | REMAINING SECOND PACKET FOR DESTINATION ADDRESS#4 |
| --→ | DESTINATION ADDRESS # 5 | REMAINING FIRST PACKET FOR DESTINATION ADDRESS#5 |
| --→ | DESTINATION ADDRESS # 5 | REMAINING SECOND PACKET FOR DESTINATION ADDRESS#5 |

Fig. 6b

SYSTEM AND METHOD OF ORDERING THE TRANSMISSION OF DATA PACKETS IN A RADIO SYSTEM

REFERENCE TO RELATED APPLICATION

This application is a continuation of U.S. patent application Ser. No. 10/083,040, filed Feb. 26, 2002, entitled "SYSTEM AND METHOD OF ORDERING THE TRANSMISSION OF DATA PACKETS IN A RADIO SYSTEM", which claims the benefit of U.S. Provisional Patent Application Ser. No. 60/272,220, filed Feb. 28, 2001, entitled "SYSTEM AND METHOD OF ORDERING THE TRANSMISSION OF DATA PACKETS IN A RADIO SYSTEM", the entireties of which are incorporated herein by reference.

TECHNICAL FIELD

The present invention generally relates to communication systems, and in particular to a system and method for transmitting data packets in a cellular communication system.

BACKGROUND OF THE INVENTION

The use of cellular communication systems having mobile devices which communicate with a hardwired network, such as a local area network (LAN) or a wide area network (WAN), has become widespread. Retail stores and warehouse, for example, may user cellular communications systems with mobile data terminals to track inventory and replenish stock. The transportation industry may use such systems at large outdoor storage facilities to keep an accurate account of incoming and outgoing shipments. In manufacturing facilities, such systems are useful for tracking parts, completed products and defects. Such systems are also utilized for cellular telephone communications to allow users with wireless telephones to roam across large geographical regions while retaining telephonic access. Paging networks also may utilize cellular communications systems which enable a user carrying a pocket sized pager to be paged anywhere within a geographic region.

A typical cellular communications system includes a number of fixed access points (also known as base stations) interconnected by a cable medium often referred to as a system backbone. Also included in many cellular communications systems are intermediate access points which are not directly connected to the system backbone but other wise perform many of the same functions as the fixed access points. Intermediate access points, often referred to as wireless access points or base stations, increase the area within which access points connected to the system backbone can communicate with mobile devices.

Associated with each access point is a geographic cell. The cell is a geographic area in which an access point has sufficient signal strength to transmit data and receive data from a mobile device such as a data terminal or telephone with an acceptable error rate. Typically, access points will be positioned along the backbones such that the combined cell area coverage from each access point provides full coverage of a building or site.

Mobile devices such as telephones, pagers, personal digital assistants (PDA=s), data terminals etc. are designed to be carried throughout the system from cell to cell. Each mobile device is capable of communicating with the system backbone via wireless communication between the mobile device and an access point to which the mobile device is registered. As the mobile device roams from one cell to another, the mobile device will typically deregister with the access point of the previous cell and register with the access point associated with the new cell. In order to provide sufficient cell area coverage, access points within the cellular communications system typically are distributed at a separate physical locations throughout an entire building or set of buildings.

Presently radio systems transmit packets of information utilizing an Internet Protocol (IP) or other type protocol. The IP protocol includes a destination address, a source address, a length component and a data component. The data packets are stored in a queue and transmitted on a first in first out (FIFO) basis. Once a data packet is transmitted to a particular destination address, the remaining radio systems will remain idle until the entire transmission is complete. Recently a standard for wireless local area networks (WLANs) known as the IEEE 802.11 standard has been proposed and has gained acceptance among the industrial, scientific and medical communities. The IEEE 802.11 standard for WLANs is a standard for systems that operate in the 2,400-2,483.5 MHz industrial, scientific and medical (ISM) band. The ISM band is available worldwide and allows unlicensed operation of spread spectrum systems. Once a preamble of an IEEE 802.11 protocol packet is correctly received by other radio devices, they must remain off for an entire frame. This causes stations that are outside an intended transmission range to remain idle during the frame transmission reducing the entire throughput of the system.

Regardless of the type of protocol used in a cellular communication system, all devices within a range will remain off during a transmission of a packet to a destination address. In a typical radio system, if a packet is sent to a destination address and for some reason or another the packet is not properly received by the destination device, the radio system will immediately retry sending the packet a predetermined number of times before timing out. The destination device may not receive the packet because the device is turned off, the device is out of range, or for some reason or the other the packet becomes corrupted. During these retries other devices within the cell will remain idle and additional packets to be sent to other destination addresses will remain in the queue until the retries are completed. This reduces the throughput of the entire system.

SUMMARY OF THE INVENTION

The present invention provides for a system and method that reorders the transmission of data packets in a transmission queue of a radio system when an error is received during the transmission of a data packet to any device destination address. The present invention provides for a transmission ordering component that transmits data packets in a queue one at a time until a transmission error occurs for a given destination address. A transmission error can occur because a radio device that the radio system is communicating to has not yet been turned on, the radio device is out of range or for some reason the transmitting data packet has become corrupted. The transmission ordering component transmits packets in a queue one at a time until a transmission error occurs and instead of retrying the transmission and congesting the cell area of the transmission path, the transmission ordering component searches through the queue for a data packet with a different destination address than the current destination address being transmitted. The transmission ordering component then returns to transmitting packets one at a time until the end of the queue is reached. Once the end of the queue is reached, the transmission reordering queue reorders the queue and moves the packets in which transmission errors have occurred to the beginning of the queue. The transmission ordering component then repeats the transmitting of data packets one at a time.

In accordance with one particular aspect of the invention, a radio system in a cellular communication system is provided. The radio system includes a radio device adapted to transmit data packets over an radio frequency link, a processor coupled to the radio device, a memory coupled to the processor, the memory including a data packet transmission queue and a transmission ordering component. The processor transmits a data packet in the data packet transmission queue having a first destination address over the radio device and the transmission ordering component searches through the queue for a data packet having a second destination address upon an occurrence of an error in the transmitting of a data packet of the first destination address. The processor then transmits the data packet of the second destination address over the radio device.

One particular aspect of the invention relates to a method for transmitting data packets over a radio device in a cellular communication system. The method comprises providing a queue having a plurality of data packets for transmitting over the radio device, transmitting a first data packet with a first destination address over the radio device, checking for an error in the transmission of the first data packet with the first destination address, searching the queue for a data packet having a second destination address upon detection of an error in the transmission of the first data packet with the first destination address and transmitting the data packet of the second destination address over the radio device.

Another aspect of the present invention relates to a computer program embodied on a computer readable medium for transmitting data packets over a radio device in a cellular communication system. The computer program includes a data packet transmission queue for storing data packets to be transmitted over the radio device and a transmission ordering module adapted to transmit data packets one location at a time in the data packet transmission queue until a transmission error occurs. The transmission ordering module then advances to a location in the data packet transmission queue having a data packet with a different destination address than the data packet in which the transmission error has occurred.

Yet another aspect of the present invention relates to a radio system in a cellular communication system. The radio system includes a personal computer system including a processor and a memory coupled to the processor. The processor runs an operating system on the personal computer system. The radio system also includes a radio device coupled to the processor, the radio device residing on a PCMCIA card and is adapted to communicate with at least two other radio systems through an RF receiver and transmitter coupled to an antenna. A transmission ordering component is provided that is adapted to transmit data packets stored in a queue in the memory one location at a time until a transmission error occurs, wherein the transmission ordering component advances to a location in the queue having a data packet with a different destination address than the data packet in which the transmission error has occurred.

Still yet another aspect of the present invention relates to a radio system in a cellular communication system. The system includes a radio device adapted to communicate with at least two other radio systems over a radio frequency link, means for storing data packets to be transmitted over the radio frequency link, and means for transmitting the data packets stored in the means for storing data packets over the radio frequency link. The means for transmitting is adapted to transmit data packets stored in the means for storing one location at a time until a transmission error occurs, wherein the means for transmitting advances to a location in the means for storing having a data packet with a different destination address than the data packet in which the transmission error has occurred.

To the accomplishment of the foregoing and related ends, the invention, then, comprises the features hereinafter fully described and particularly pointed out in the claims. The following description and the annexed drawings set forth in detail certain illustrative examples of the invention. These examples are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIGS. 6a-6b is a block diagram of queue having a number of data packets therein in accordance with the present invention.

DETAILED DESCRIPTION OF THE INVENTION

The present invention will now be described with reference to the drawings. The present invention will be described with reference to a system and method that reorders the transmission of data packets in a queue of a radio system when an error is received during the transmission of a data packet to any device destination address. The present invention transmits a packet in a queue and upon an error in the transmission of that packet searches through the queue for the next data packet having a different destination address. The data packet and all subsequent packets in the queue for the next destination address are then transmitted. This is repeated for all data packets in a queue until the last data packet in the queue is transmitted. The present invention then returns to the data packet where a transmission error has occurred and repeats the process of transmitting and searching for new destination addresses if an error occurs. It should be understood that the description of these aspects of the present invention are merely illustrative and that they should not be taken in a limiting sense.

Figure 1:
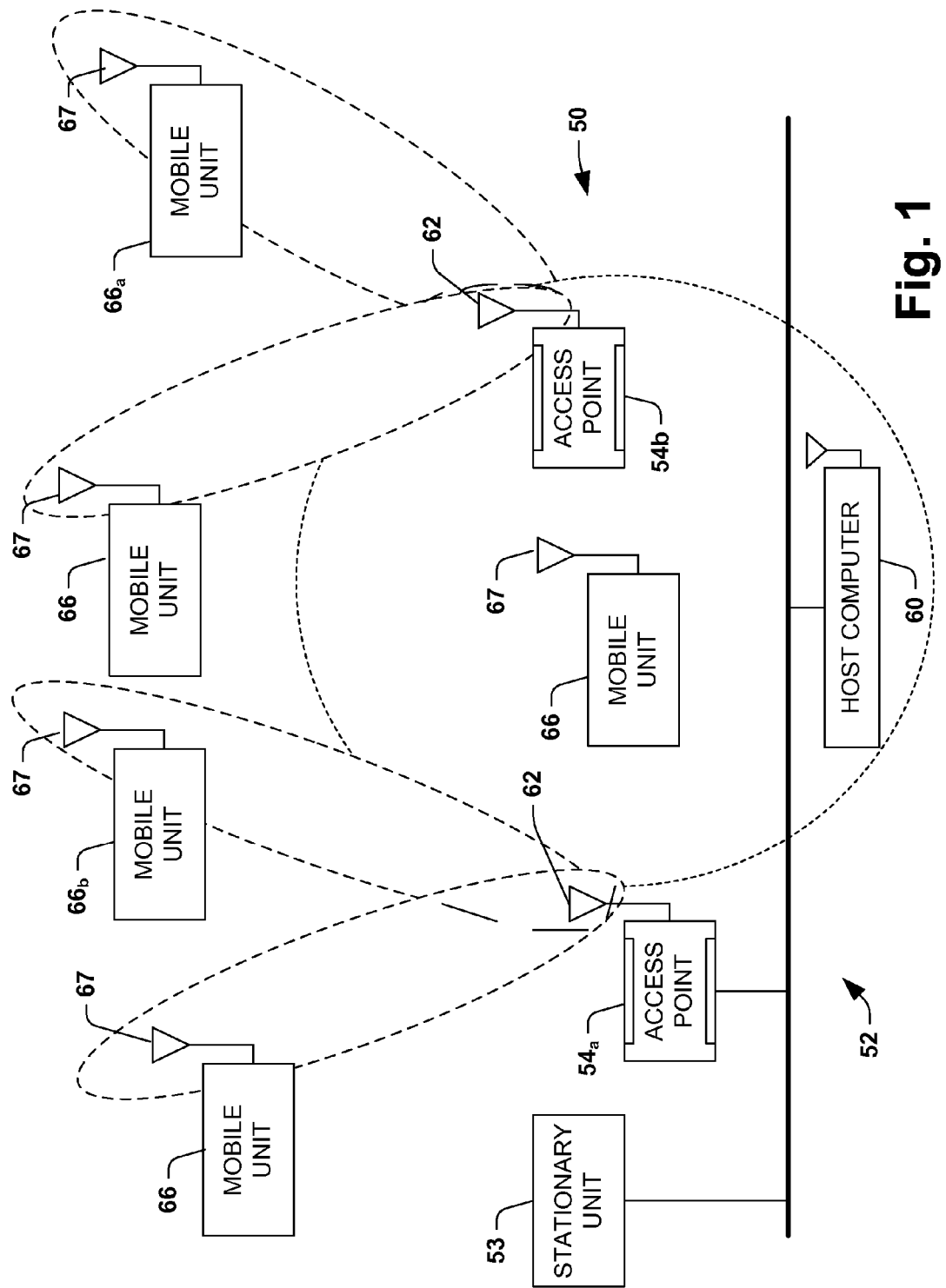
FIG. 1 is a system diagram of a network communication system in accordance with the present invention.

Referring now to FIG. 1, a cellular communication system 50 illustrating an environment of the present invention is shown. The cellular communication system 50 includes a local area network (LAN) 52. The LAN or network backbone 52 may be a hardwired data communication path made of twisted pair cable, shielded coaxial cable or fiber optic cable, for example, or may be wireless or partially wireless in nature. Coupled to the LAN 52 are a stationary communication unit 53 and several access points 54. Only one access point 54a is shown hardwired to the network backbone 52, however, it is understood that more than one hardwired access points 54a may be physically connected to the network backbone 52. The access points 54 may be hardwired to the network 52 such as access point 54a or may be wirelessly coupled to the backbone 52 such as access point 54b. Each access point serves as an entrance point through which wireless communications may occur with the network backbone 52. The wireless access point 54b may be employed to expand the effective communication range of the cellular communication system 50. As is conventional, each wireless access point 54b associates itself, typically by registration, with another access point or a host computer 60 coupled to the network backbone 52, whether hardwired or wireless, such that a link is formed between itself and other devices situated on the network backbone 52.

Each access point 54 is capable of wirelessly communicating with other devices in the communication system 50 via respective antennas commonly denoted by reference numeral 62. The antenna 62 for any particular device may be of any type suitable for use in a network cellular communication system, such as an omni-directional antenna, a yagi-type antenna, etc. A geographic cell (not shown) associated with each access point 54 defines a region of coverage in which successful wireless communication may occur. Depending on the type of antenna 62 selected and output power of the respective access point, the geographic cell may take one of several different forms and sizes. For example, the antenna 62 could be an omni-directional antenna if a generally spherical cell area of coverage is desired. A directed yagi-type antenna could be used as the antenna 62 for a more directed elliptical cell area of coverage.

The cellular communication system 50 also includes one or more mobile communication units 66. The mobile communication units 66 each include an antenna 67 for wirelessly communicating with other devices. Each mobile communication unit 66 communicates with devices on the network back 52 via a selected access point 54 and/or with other mobile communication units, and/or directly with the host computer 60 if within cell range of the host computer 60. Upon roaming from one cell to another, the mobile communication unit 66 is configured to associate itself with a new access point 54 or directly with the host computer 60 if within range. A mobile communicate unit 66 registers with a particular access point which provides the particular mobile communications unit with wireless access to the network backbone 52. Each access point 54 and each mobile communication unit employ the packet transmission ordering system of the present invention. In a preferred aspect of the invention, the host computer 60 includes an antenna and employs the packet transmission ordering system during any wireless transmissions.

Figure 2A:
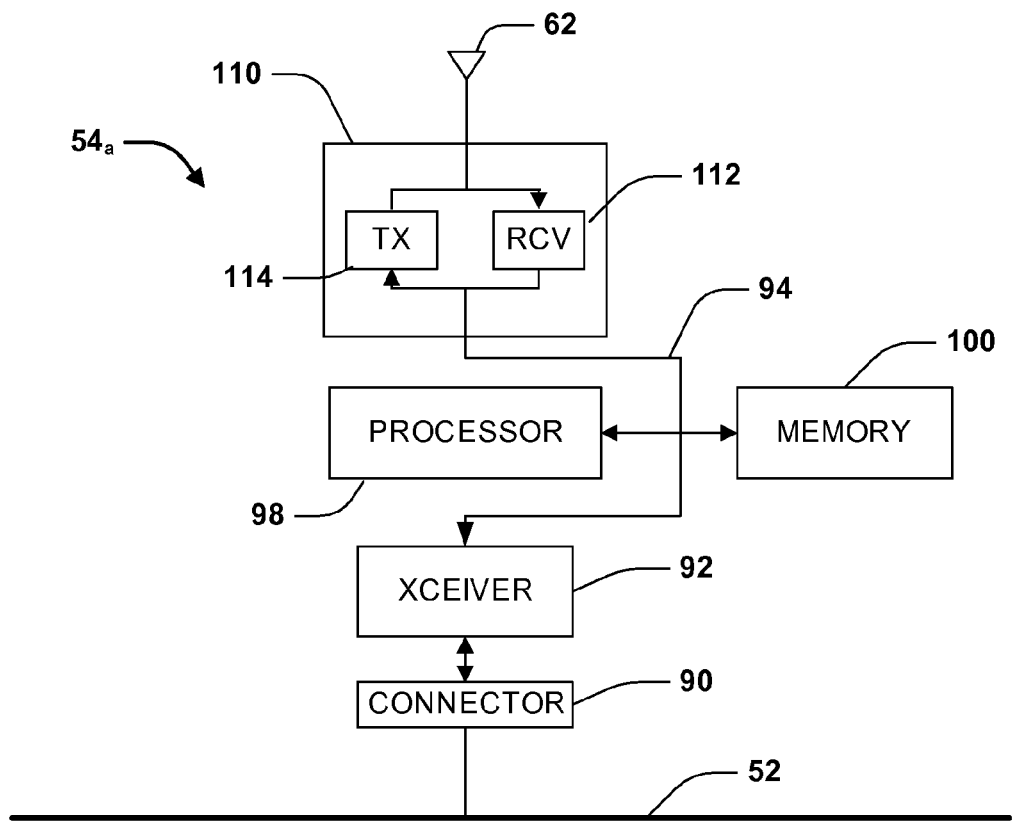
FIG. 2a is a block diagram of a hard wired access point system in accordance with the present invention.

FIG. 2a is a block diagram representative of each hardwired access point 54a. Each hardwired access point 54a is connected to the network backbone 52 via a connector 90 such as DB-9 or RJ-45 connector. The connector 90 is connected to the network backbone 52 at one end and to a network adapter transceiver 92 included in the access point 54a at the other end. The network adapter transceiver 92 is configured according to conventional adapter transceiver techniques to allow the access point 54a to communicate over the network backbone 52. The network adapter transceiver 92 is also connected to an internal bus 94 included within the access point 54a. The access point 54a further includes a processor 98 connected to the bus 94 for controlling and carrying out the operations of the access point 54a. The processor 98 may include any of a variety of different microprocessors, such as the Motorola 68360 or Intel 80486 microprocessors. It is understood that any suitable processor capable of carrying out the herein described functions of the access points 54a may be used and falls within the scope of this invention.

The access point 54a also includes a memory 100 connected to the bus 94. The memory 100 stores program code executed by the processor 98 for controlling the other elements within the access point 54a to carry out the functions described herein. It will be readily apparent to a person having ordinary skill in the art of microprocessor programming how to program the processor 98 to carry out the operations described herein using conventional programming techniques based on the flowcharts and descriptions provided herein. Accordingly, additional detail as to the specific program code has been omitted. The memory 100 also serves as a queue to buffer packets of information such as those received over the network backbone 52 or those transmitted to or received from the mobile communication units 66 or wireless access points 54b. Furthermore, the memory 100 may store tables relating to which of the mobile communication units 66 are registered to the network backbone 52 and/or the identification codes of the mobile communication units 66.

Also connected to the bus 94 is a radio frequency (RF) section 110 included in the access point 54a. The RF section 110 includes the aforementioned antenna 62 for receiving radio signals from the transmitting radio signals to mobile communication units 66 and wireless access points 54b (FIG. 2b) within the cell area of the access point 54a. Information transmitted from a mobile communication unit 66 or wireless access point 54b is received via the antenna 62 and is processed by an RF receiver 112 which is connected to the bus 94 and demodulates and decodes the signal and converts the signal to a digital signal having a specific packet format. The processor 98 controls an RF transmitter 114 included in the RF section 110, the RF transmitter also being connected to the bus 94. The processor 98 causes the RF transmitter 114 to modulate and transmit an RF signal which in turn carries the information packet to the appropriate mobile communication unit 66 or wireless access point 54b.

Figure 2B:
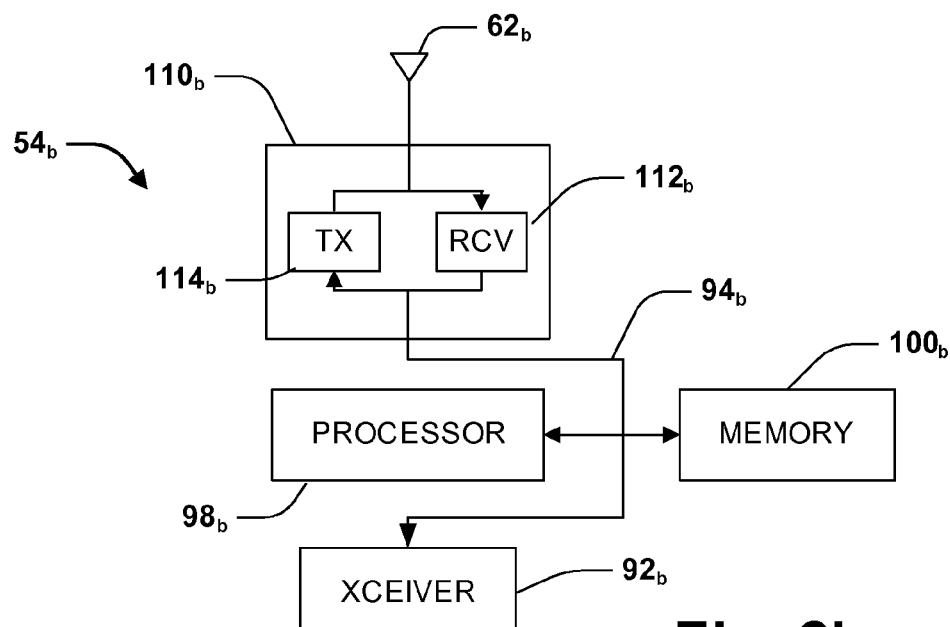
FIG. 2b is a block diagram of a wireless access point system in accordance with the present invention.

FIG. 2b is a block diagram representative of each wireless access point 54b in the system 50. For the most part, the construction and operation of the components within the wireless access point 54b are identical to those described with respect to the access points 54a. Hence, similar components are denoted simply by the addition of a [b]. For example, the processor 98 in access point 54a is equivalent to the processor 98b in the wireless access point 54b. However, the wireless access point 54b is not connected directly to the network backbone 52 and therefore does not include a network transceiver 92 or connector 90 as in each access point 54a. Rather, the wireless access point 54b communicates with mobile communication units 66 registered thereto and with the particular access point with which the wireless access point 54b is associated with via the RF section 110b. Operations of the two access points 54a and 54b are primarily the same with the exception of the particular procedures described herein. As mentioned above, the wireless access points 54b function to extend the relative cell coverage of a given access point 54a= and serve primarily to relay information between the access points 54a and connected to the network backbone 52 and mobile communication units 66.

Figure 2C:
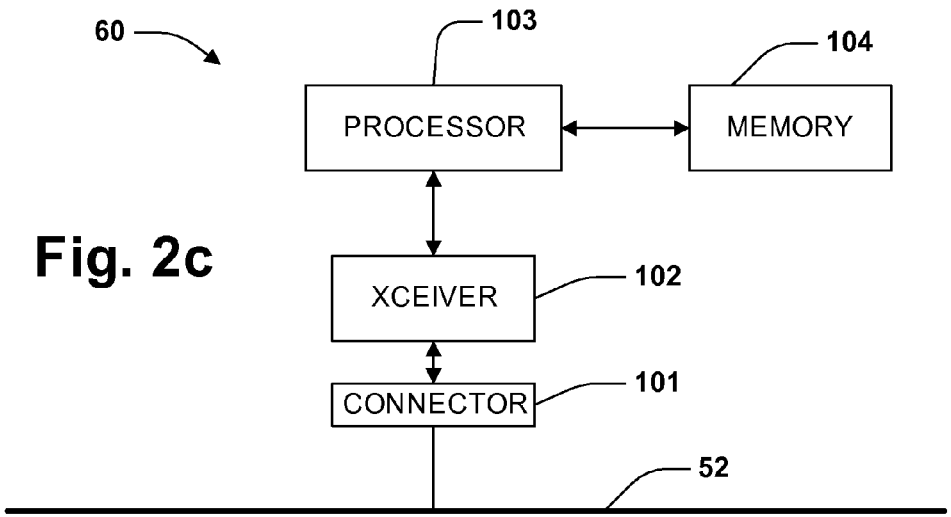
FIG. 2c is a block diagram of a host computer system in accordance with the present invention.

FIG. 2c is a block diagram representative of the host computer 60 of the present invention. Although operations performed by the host computer 60 are conventionally different than the operations of a base station 54, the hardware components are similar to those hardware components described with respect to base station 54a in FIG. 2a. Hence, the function and interconnection among the hardware components will not be described again in detail. Rather, as shown in FIG. 2c, similar to base station 54a, the host computer includes a backbone connector 101, a transceiver 102, a processor 103 and a memory 104. Unlike the base stations 54, however, the host computer 60 does not need to include an RF section 110. Thus, in order for the host computer 60 to communicate with any mobile communication unit 66, the host computer 60 will route all such communication over the backbone 52 and through one of the base stations 54. Similarly, for a mobile communication unit 66 to communicate with the host computer 60, the mobile communication unit 66 will first access the network backbone 52 through one of the existing base stations 54 which will then ensure the communication is properly delivered to the host computer 60. The host computer 60 serves as a central unit where large operational based and application based software programs are stored and executed in order to provide the necessary functions which the communication system 50 was installed to perform. The data packet transmission ordering may occur in the host computer 60 or the base station 54.

Figure 2D:
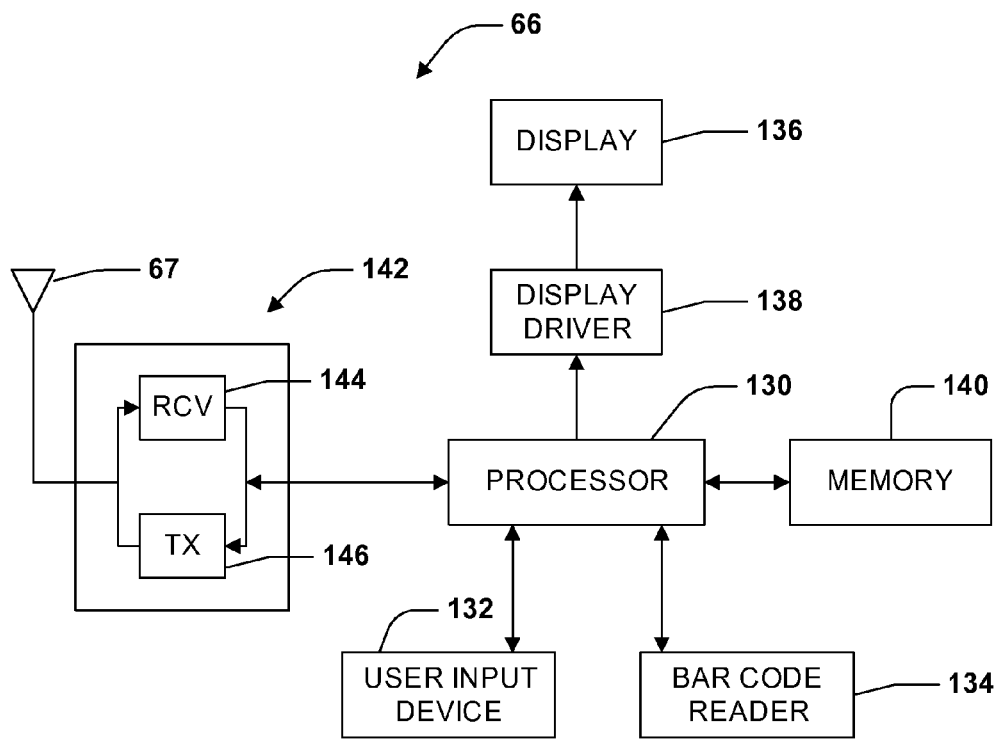
FIG. 2d is a block diagram of a mobile communication device in accordance with the present invention.

FIG. 2d is a block diagram representing the basic structure of each mobile communication unit 66 according to the exemplary embodiment. Each mobile communication unit 66 includes a processor 130 which can be programmed to control and operate the various components within the mobile communication unit 66 in order to carry out the various functions described herein. The processor 130 has coupled thereto a user input device 132 which allows a user to input data to be communicated to the network backbone 52 such as inventory data, patient information, etc. This information may be sent to the host computer 60 which serves as a central data location, for example, or to a cash register connected to the network backbone 52, as another example, for providing price information. The input device 132 can include such items as a keypad, touch sensitive display, etc. The mobile communication unit 66 also may include a bar code scanner 134 coupled to the processor 130 serving as another form of data input. A display 136 is connected to and controlled by the processor 130 via a display driver circuit 138. The display 136 serves as a means for displaying information stored within the mobile communication unit 66 and/or received over the network backbone 52 via a base station 54. The display 136 can be a flat panel liquid crystal display with alphanumeric capabilities, for example, or any other type as display as will be appreciated. Alternatively, the data packet transmission ordering may occur in a mobile client or at a wireless access point.

A memory 140 is included in each mobile communication unit 66 for storing program code executed by the processor 130 for carrying out the functions described herein. The actual code for performing such functions could be easily programmed by a person having ordinary skill in the art of microprocessor programming in any of a number of conventional programming languages based on the disclosure herein. Consequently, further detail as to the particular code has been omitted for sake of brevity. The memory 140 also serves as a queue and a storage medium for storing information packets received from or intended to be transmitted to a base station 54 as discussed herein. Furthermore, the memory 140 stores an identification code which is used to designate and distinguish the mobile communication unit 66 from the other mobile communication units 66 registered to the network backbone 52.

Each mobile communication unit 66 also includes it own RF section 142 connected to the processor 130. The RF section 142 includes an RF receiver which receives the RF transmissions from a base station 54 via an antenna 67 and demodulates the signal to obtain digital information modulated therein. The RF section 144 also includes an RF transmitter 146. In the event the mobile communication unit 66 is to transmit information to the network backbone 52 in response to an operator input at input device 132, for example, the processor 130 forms within the memory 140 an information packet including data together with a source address (i.e., the address of the particular mobile communication unit 66 sending the information) and a destination address (e.g., the host computer 60 or other network device). The information packet is then delivered to the RF transmitter 146 which transmits and RF signal with the information packet modulated thereon via the antenna 67 to the base station 54 with which the mobile communication unit 66 is registered.

Figure 3:
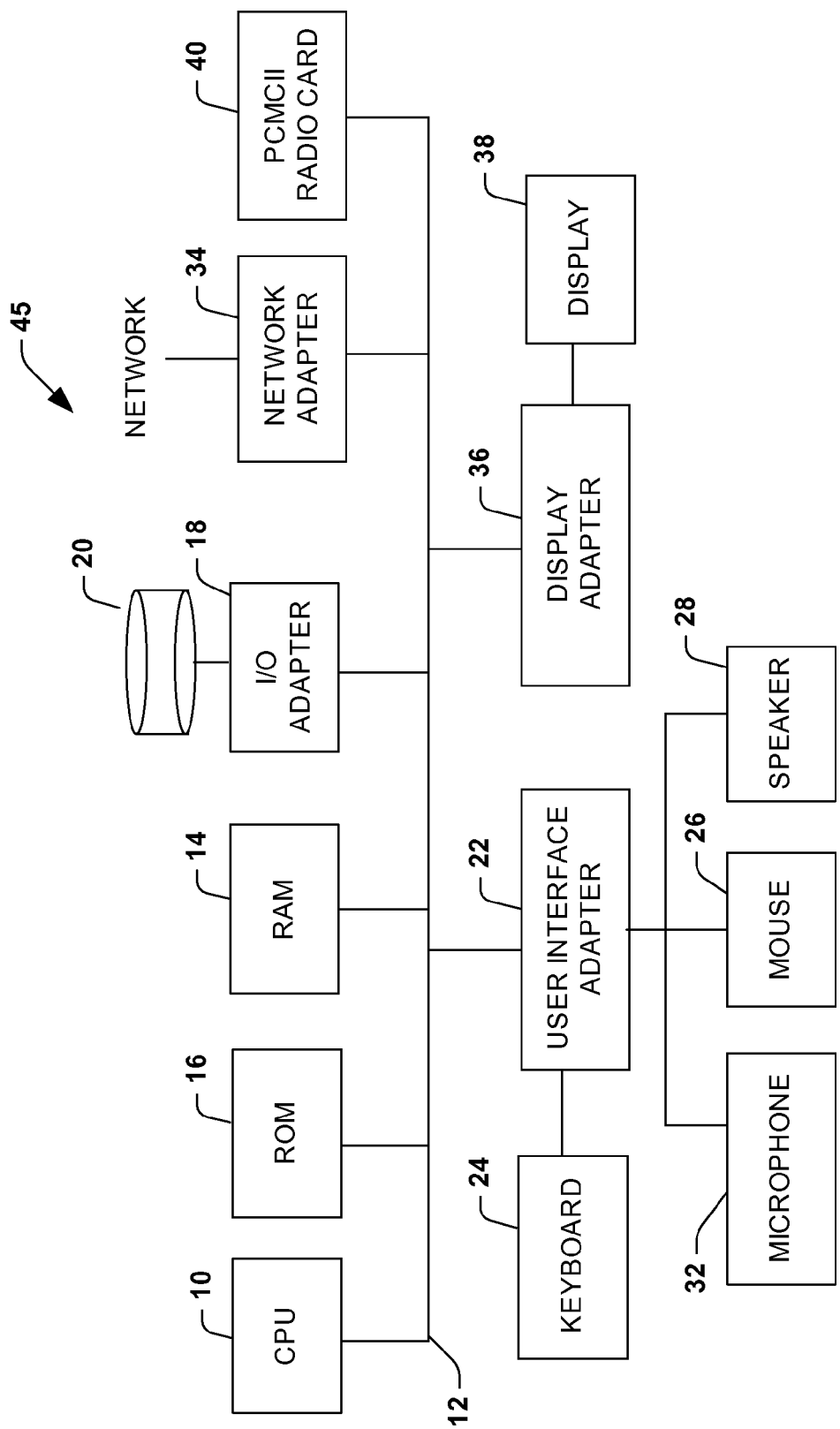
FIG. 3 is a block schematic diagram of a computer system in accordance with the present invention.

A system in accordance with the present invention can be practiced in the context of a personal computer (PC) 45 such as an IBM, Apple Macintosh or UNIX based computer. A representative hardware environment is depicted in FIG. 3, which illustrates a typical hardware configuration of a workstation or PC in accordance with an embodiment having a central processing unit 10, such as a microprocessor, and a number of other units interconnected via a system bus 12. The workstation shown in FIG. 3 includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g. a data processing network) and a display adapter 36 for connecting the bus 12 to a display device 38. In addition, the hardware configuration includes a PCMCIA radio card 40 plugged into the backplane of the computer connecting the radio card 40 to the system bus 12. The workstation typically has resident thereon an operating system such as Microsoft Windows Operating System (OS), the IBM OS/2 operating system, the MAC OS, or UNIX operating system. Preferably, the operating system is a Microsoft Windows NT or Microsoft Windows CE operating system, providing the system with network capabilities.

The processor 10 (FIG. 3) is programmed to control and operate the various components within the computer system 45 in order to carry out the various functions described herein. The processor or CPU 10 can be any of a plurality of processors, such as the p24T, Pentium 50/75, Pentium 60/90, and Pentium 66/100, Pentium PRO and Pentium 2, and other similar and compatible processors. The manner in which the processor 10 can be programmed to carry out the functions relating to the present invention will be readily apparent to those having ordinary skill in the art based on the description provided herein. Furthermore, the manner in programming the processor 10 to operate the invention according to the description herein will be apparent to those skilled in the art of computer programming.

Typically, access points 54 and mobile units 66 in the same cells can communicate with each other during the same time period, such that simultaneous communication is occurring in system 50. However, access points 54 and mobile units 66 complying to the IP or IEEE 802.11 protocol will remain dormant during a transmission from one access point 54 or mobile unit 66 to another access point 54 or mobile unit 66. Furthermore, these radio devices will remain dormant while the transmitting device is retrying to send a packet that was not received correctly by a destination device. Other data packets will remain in the queue of the transmitting device during these unsuccessful retries. Both of these components reduce the throughput of the system 50.

Figure 4:
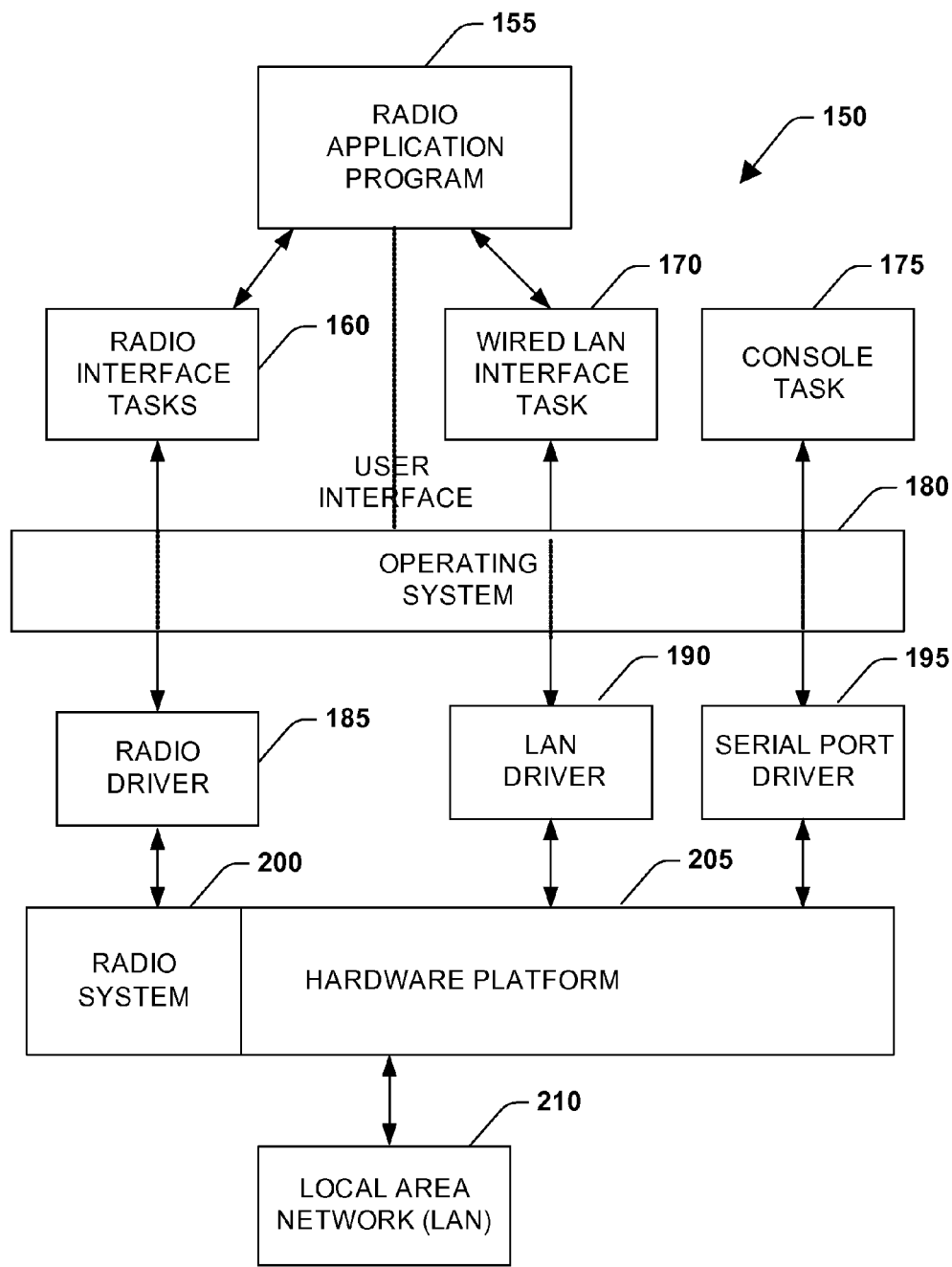
FIG. 4 is a block schematic diagram of interprocess communication flow in accordance with the present invention.

Referring to FIG. 4 illustrating a schematic block diagram of a radio device system 150 provided with several interface layers. The radio device system could be any of an access point 54, a mobile communication unit 66 and a host computer 60. Each interface layer of the system 150 could include a queue for handling radio data packets. It is to be appreciated that the present invention of handling data packet transmission can be implemented into any of the layers of the radio device system 150. The radio device system includes a radio application program component 155 communicatively coupled to a radio interface task component 160. The radio application program 155 is also communicatively coupled to a wired LAN interface component 170 provided to interface the application program 155 with a local area network (LAN) 210 via a LAN driver 190. The application program 155 allows a user to communicate data through the radio device system 150 to other devices. The application program 155 can include the necessary components for searching for the next destination address packet in a queue based on a failed transmission of the current destination address.

The radio interface task component 160 is inserted between the application program 155 and the radio driver 185 residing on the computer operating system 180 to provide a level of abstraction between the hardware and software components of the system 150. The radio interface task component 160 can include the necessary components for searching for the next destination address packet in a queue based on a failed transmission of the current destination address. The radio driver 185 is specific to the radio system 200 that is part of a hardware platform 205 of the system 150. The radio driver can include the necessary components for searching for the next destination address packet in a queue based on a failed transmission of the current destination address. The hardware platform 205 can be an embedded processor system or a personal computer system. If the radio system is an embedded processor system, the firmware can include the necessary components for searching for the next destination address packet in a queue based on a failed transmission of the current destination address. The radio system 200 can be a PCMCIA card that is plugged into the backplane of the personal computer. The radio interface component 160 isolates the radio specific activity from the application program 155 and other software from changes in the radio hardware or changes in the radio protocol.

The application program 155, the radio interface component 160, the wired LAN Interface component 170, and a console task component 175 of system 150 can be implemented on top of an existing operating system, such as Windows NT and Windows CE. This allows for the use of an existing network connection system and existing radio drivers, while providing another level of abstraction between the software and the hardware of the system 150. The system 150 also includes a console task component 175 for interfacing with a console through a serial port driver 195. A console (not shown) can then be plugged into a RS232 port for communicating with the system through a text based window or the like.

Figure 5A:
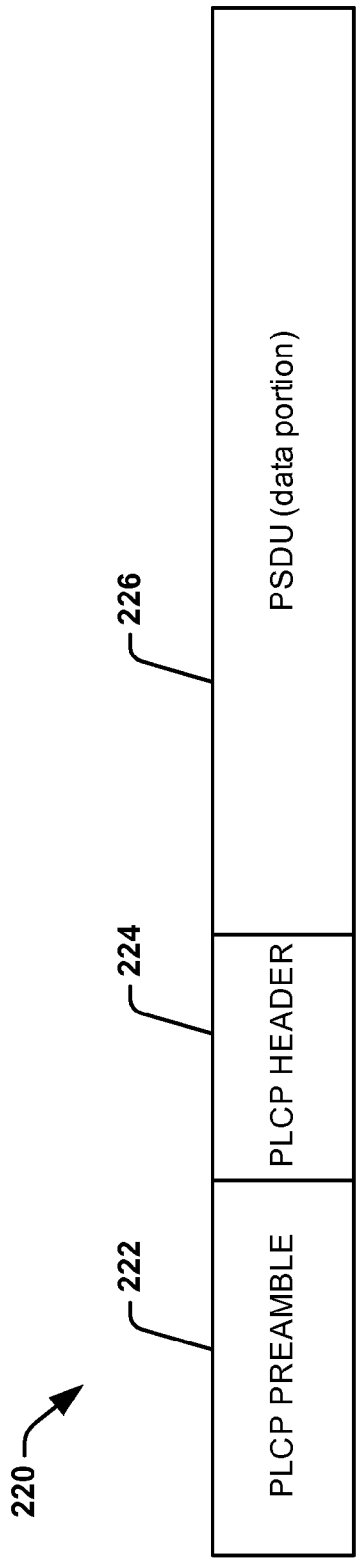
FIG. 5a is a block diagram of a IEEE 802.11 data packet in accordance with the present invention.
Figure 5B:
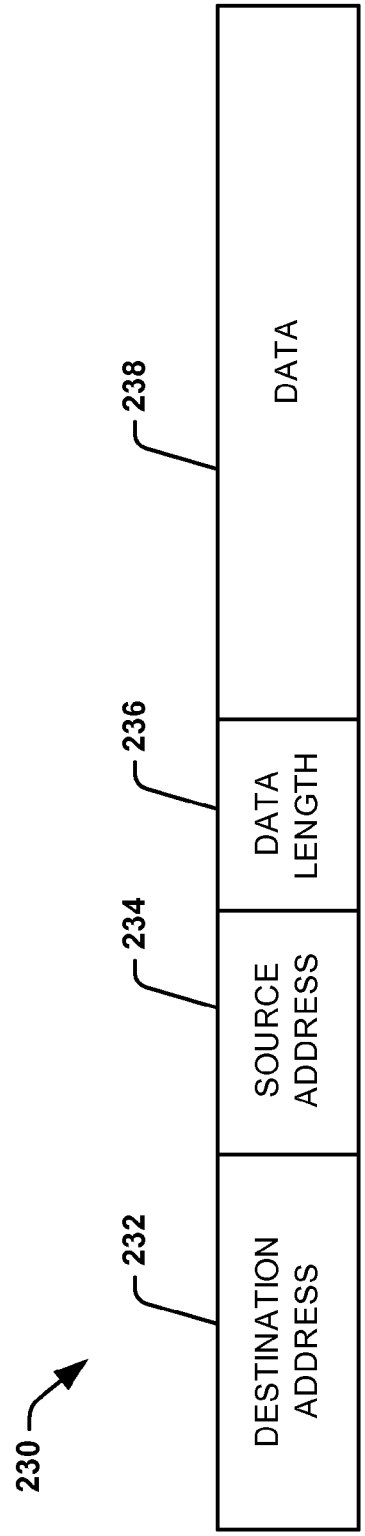
FIG. 5b is a block diagram of an IP data packet in accordance with the present invention.

FIGS. 5*a* and 5*b* illustrate the different portions of a packet 220 transmitting over the radio device system 150. FIG. 5*a* illustrates a IEEE 802.11 packet 220 that includes a Physical Layer Convergence Procedure (PLCP) preamble portion 222, a PLCP header portion 224, and a Protocol Data Unit (PDU) portion 226 (data portion). The PLCP preamble 222 includes the necessary destination address information. FIG. 5*b* illustrates a typical IP packet 230 having a destination address field 232, a source address field 234, a data length field 236 and a data field 238. All devices within a range of the transmitting device, with the exception of the destination device, will remain off after the transmission of the PLCP preamble 222 (e.g., for a wireless transmission) or the destination address 232 (e.g., for a wired transmission) during a transmission of a packet to a destination address.

FIGS. 6*a* and 6*b* illustrate a queue 240 containing a plurality of data packets with varying destination addresses. The packet ordering transmission system of the present invention transmits packets in the queue on a FIFO basis, unless and error in the transmission of a packet has occurred. Alternatively, the packet ordering transmission can transmit packets based on packet prioritization (e.g., age of packet, time to live, number of retries, retransmit until delivered). As illustrated in FIG. 6*a*, a packet pointer points to the data packet that is currently being transmitted. The packet pointer points to the first packet in the queue which has a destination address #1. The first and the second packets of destination address #1 are transmitted. The packet pointer then advances to the third location of the queue to a packet which has a destination address #2. The first packet of destination address #2 is transmitted, but an error in the transmission has occurred. The packet pointer then moves to the next data packet with a different destination address and attempts to transmit the first data packet of destination address #3. This transmission of the data packet is successful and the packet pointer continues through the queue, until the queue is empty. Once the packet pointer moves to the end of the queue, the queue is reordered and packets with unsuccessful destination address transmission are moved to the beginning of the queue and successful transmission are removed from the queue, as illustrated in FIG. 6*b*. The packet pointer then begins moving through the queue as packets are transmitted. As can be seen in FIG. 6*b*, the first through third packet for destination address #2 are successful, and new data packets for destination address #4 and destination address #5 enter the queue. The first packet transmission for destination address #4 is unsuccessful and the packet point moves to a new destination address, which is destination address #5. Packet transmission for destination #5 is successful such that the first and second packets of destination #5 are transmitted. The queue will then be reordered with the packets of destination #4 being moved to the beginning of the queue.

Figure 7:
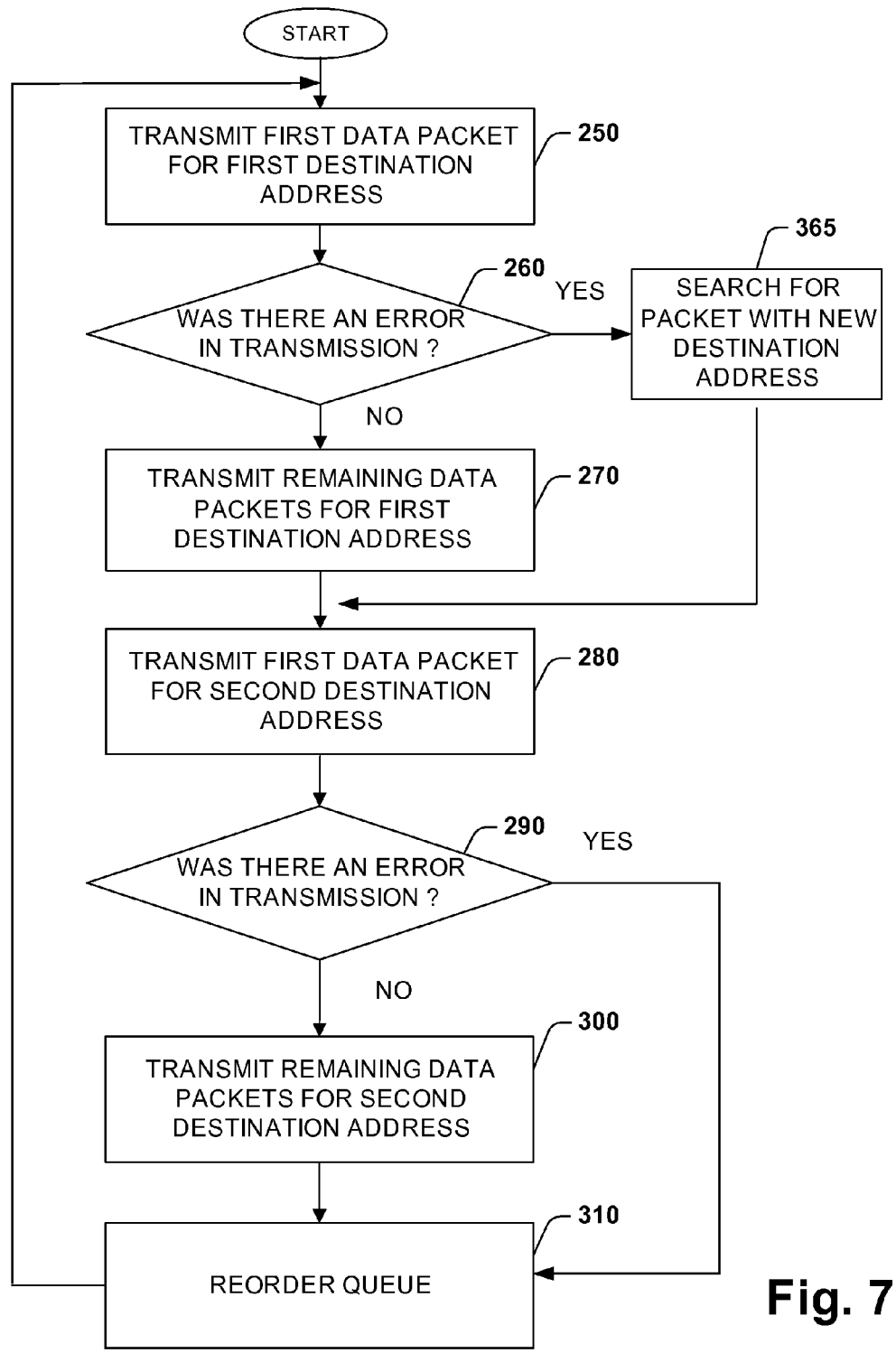
FIG. 7 is a flow diagram illustrating one particular methodology for transmitting data packets in accordance with the present invention.

FIG. 7 is a flow diagram illustrating one particular methodology for transmitting data packets in a queue for a first and a second destination address according to the present invention. At 250, the radio system 150 transmits a first data packet for first destination address. At 260, the processor of the radio system 150 checks for a transmission error during transmission of the first data packet. If there is an error in transmission (YES), the processor then searches for a data packet with a new destination address at 265 and advances to 280. If there is no error in the transmission (NO), the radio system 150 transmits the remaining data packets for the first destination address at 270. At 280, the radio system 150 transmits a first data packet for a second destination address. At 290, the processor of the radio system 150 checks for a transmission error during transmission of the first data packet. If there is an error in transmission (YES), the processor reorders the queue at 310 and returns to 250 to the beginning of the queue. If there is no error in the transmission (NO), the radio system 150 transmits the remaining data packets for the second destination address at 300. At 310, the processor reorders the queue and returns to 250 to the beginning of the queue.

What has been described above are certain aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A radio system in a cellular communication system, comprising:
   a radio device with a processor to control the operations of the device;
   an input component coupled to the processor;
   a memory coupled to the processor, the memory including a data packet transmission queue; and
   a transmission ordering component transmits data packets one location at a time in the data packet transmission queue until a transmission error occurs, wherein the transmission ordering module advances to a location in the data packet transmission queue having a data packet with a different destination address than the data packet in which the transmission error has occurred, the transmission ordering component reorders the queue after reaching the end of the queue by moving data packets in which transmission errors have occurred to the beginning of the queue.

2. The system of claim 1, further comprising a radio frequency (RF) receiver and a RF transmitter.

3. The system of claim 1, wherein the transmission ordering component transmits packets in the queue on a FIFO basis.

4. The system of claim 1, wherein the transmission ordering component transmits packets in the queue on a packet prioritization basis.

5. The system of claim 1, wherein the transmission ordering component resides in a firmware program of the radio device.

6. The system of claim 1, wherein the transmission ordering component resides in an application program communicatively coupled to the radio device.

7. The system of claim 1, the radio device is an access point.

8. The system of claim 1, the radio device is a mobile communication unit.

9. The system of claim 1, wherein a display comprising a flat panel liquid crystal display with alphanumeric capabilities is coupled to the processor.

10. The system of claim 1, the memory stores an identification code that is unique to the radio device.

11. A method for transmitting data packets over a radio device in a cellular communication system, comprising:
   providing a packet ordering transmission queue having plurality of data packets for transmitting over the radio device; and
   pointing to a data packet that is currently being transmitted;
   transmitting a first data packet with a first destination address and pointing to a next data packet in the queue;
   checking for an error in the transmission of the first data packet with the first destination address;
   searching the queue for a data packet having a second destination address and upon detection of an error in the transmission of the first data packet with the first destination address pointing to the data packet with the second destination address;
   transmitting the data packet having the second destination address over the radio device; and
   reordering the queue after reaching the end of the queue by moving data packets with destination address having a transmission error to the beginning of the queue and pointing to the start of the queue.

12. The method of claim 11, further comprising, transmitting a second data packet with the first destination address upon detection of no error in the transmission of the first data packet with the first destination.

13. The method of claim 11, advancing through the queue as data packets are transmitted, till the end of the queue is reached.

14. The method of claim 11, further comprising repeating of transmitting, checking, searching and transmitting of data packets in the queue after the reordering.

15. A radio system in a cellular communication system comprising:
   means for communicating over a radio frequency link;
   means for storing data packets in a data packet transmission queue;
   means for transmitting the data packets stored in the transmission queue over the radio frequency link one location at a time until a transmission error occurs, wherein the means for transmitting advances to a location in the transmission queue having a data packet with a different destination address than the data packet in which the transmission error has occurred; and
   means for reordering the transmission queue after reaching the end of the transmission queue by moving data packets in which transmission errors have occurred to the beginning of the queue.

16. The system of claim 15, wherein the means for transmitting continues transmitting data packets one location at a time in transmission queue after advancing to a location in the queue with a data packet having a different destination address than the one in which a transmission error occurred.

17. The system of claim 15, wherein the means for communicating has a unique identification code stored in a memory.

18. The system of claim 15, further comprising means to input bar code data to the means for communicating.

19. The system of claim 15, further comprising means to display data coupled to the means for reordering transmission queue.

20. The system of claim 15, further comprising means for pointing to a data packet from the transmission queue that is currently being transmitted.

* * * * *

UNITED STATES PATENT AND TRADEMARK OFFICE
CERTIFICATE OF CORRECTION

PATENT NO.        : 7,633,974 B2                                    Page 1 of 1
APPLICATION NO.   : 11/841123
DATED             : December 15, 2009
INVENTOR(S)       : DeFord It is certified that error appears in the above-identified patent and that said Letters Patent is hereby corrected as shown below:

IN THE DRAWINGS

In Fig. 1, Sheet 1 of 8, delete " 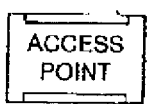 " and insert --  --, therefor.

In Column 6, Line 66, delete "54a=" and insert -- 54a --, therefor.

Signed and Sealed this
Eleventh Day of October, 2011

David J. Kappos
*Director of the United States Patent and Trademark Office*